No. 828,815. PATENTED AUG. 14, 1906.
A. H. EDWARDS.
MECHANISM FOR TRANSMITTING POWER IN VARYING DIRECTIONS.
APPLICATION FILED OCT. 20, 1905.
2 SHEETS—SHEET 1.
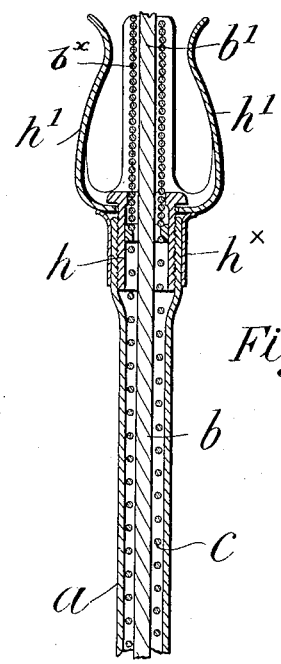
Fig. 1.
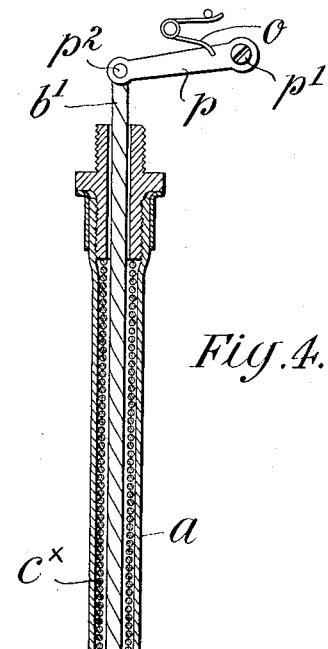
Fig. 4.
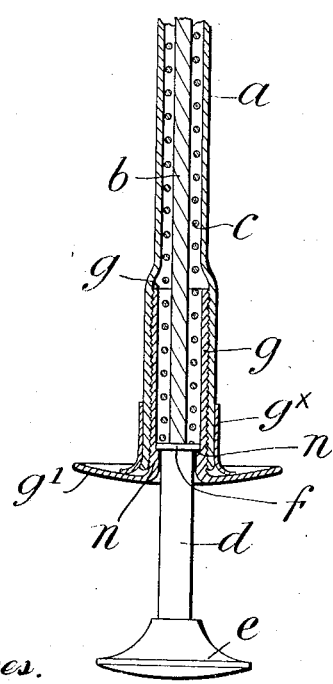
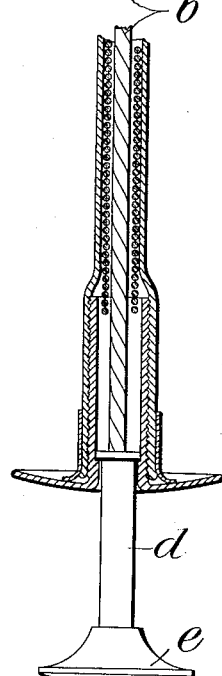
Witnesses.
W. Max. Duvall.
Geo. F. Bruce.
Inventor.
A. H. Edwards.
By Wilkinson & Fisher.
Attorneys.

No. 828,815. PATENTED AUG. 14, 1906.
A. H. EDWARDS.
MECHANISM FOR TRANSMITTING POWER IN VARYING DIRECTIONS.
APPLICATION FILED OCT. 20, 1905.
2 SHEETS—SHEET 2.
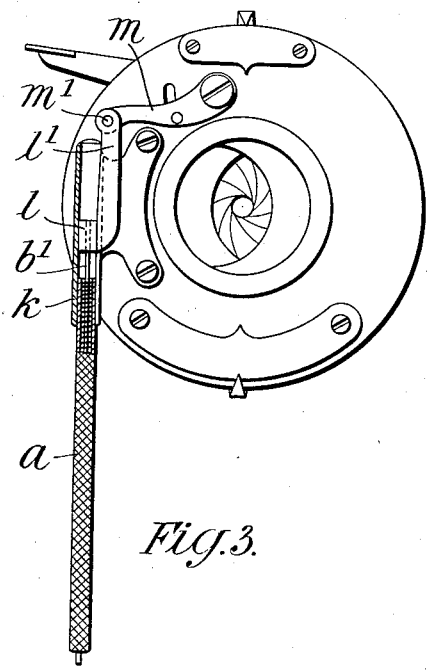
Fig.3.
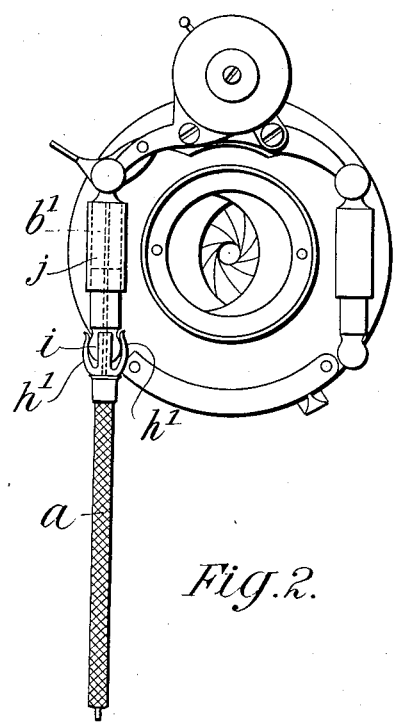
Fig.2.
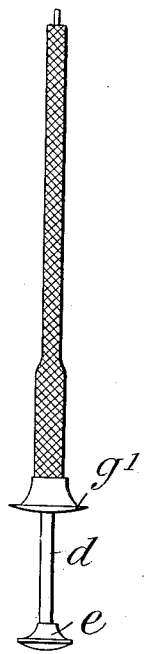
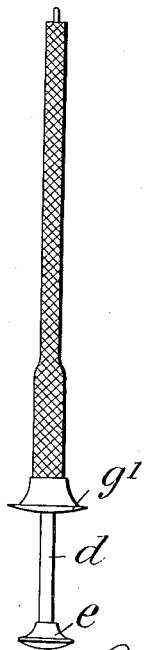
Witnesses.
W. Max. Durall.
Geo. A. Byrne.
Inventor.
A. H. Edwards.
By Wilkinson & Fisher,
Attorneys.

UNITED STATES PATENT OFFICE.

ARTHUR HENRY EDWARDS, OF STOKE NEWINGTON, LONDON, ENGLAND.

MECHANISM FOR TRANSMITTING POWER IN VARYING DIRECTIONS.

No. 828,815. Specification of Letters Patent. Patented Aug. 14, 1906.

Application filed October 20, 1905. Serial No. 283,696.

*To all whom it may concern:*

Be it known that I, ARTHUR HENRY EDWARDS, engineer, a subject of the King of Great Britain, residing at 96 Lordship road, Stoke Newington, London, England, have invented certain new and useful Improvements in Mechanism for Transmitting Power in Varying Directions, of which the following is a specification.

The object of this invention, primarily, is an improved power-transmission apparatus or mechanism for transmitting power in varying directions, especially suitable for photographic releases (i. e., mechanism for releasing or operating photographic shutters) or for any other purposes to which same may be applicable where great flexibility of such mechanism is required.

Mechanism for the transmission of power in varying directions according to the present invention comprises a flexible outer member which is compressible both lengthwise and crosswise, but is inextensible beyond its normal length, an inner member which is incompressible lengthwise and is adapted to slide within said outer member, means attached to said inner and outer members, respectively, at one end whereby said inner member may be pushed inward to actuate the part to be operated, means at the other end of said inner and outer members to attach the former to the part to be operated by such push when the inner member is pushed inward, as aforesaid, and a spring arranged and adapted to normally keep the outer member stretched to the limit of its extensibility and also adapted to normally keep the inner member pressed outwardly, so as to be ready to be operated, all as hereinafter more fully explained, and finally pointed out in the claims.

Referring to the accompanying drawings, Figure 1 is a longitudinal sectional view, taken through flexible transmission mechanism in accordance with the present invention, arranged as a "release" for photographic shutters. Fig. 2 shows a photographic shutter of a well-known type as ordinarily fitted with pneumatic cylinder and piston for a pneumatic release and showing the present invention applied to such shutter in place of said pneumatic release. Fig. 3 shows a similar type of shutter, but instead of the pneumatic cylinder, suitable means are shown for attaching the flexible release according to the present invention. Fig. 4 shows a modification of the arrangement shown in Fig. 1.

Referring now to Figs. 1 to 3, $a$ is the outermost member, which may be formed of any suitable fibrous textile fabric and advantageously is formed of braided cotton and is so constructed that although such braided outermost member $a$ is compressible both lengthwise and crosswise, nevertheless it is inextensible beyond the normal length of such outermost cover.

$b$ is the flexible innermost member and is advantageously composed of a strand of thin flexible wires in such wise as to be incompressible under the strains (pressure) to which same is normally liable.

$c$ is an open coiled spring, which in the construction shown in Fig. 1 surrounds the innermost member $b$ and forms the intermediate member between said innermost member $b$ and the outermost member $a$.

The innermost member $b$ is attached at one end to the shank $d$ of the push-button $e$, provided with a collar or enlargement $f$, and at the other end $b'$ said innermost member $b$ is attached to or is otherwise arranged to actuate the part or thing to be operated, said innermost member being adapted to slide freely through and with respect to the intermediate member $c$ and the outermost member $a$.

The outermost member $a$ at one end is attached to the sleeve $g$ by passing the end of this flexible outermost member $a$ over said sleeve $g$ down to the enlargement or flange $g'$ thereon and is there secured by the collar $g^\times$, which is slid over said member $a$ and sleeve $g$ and clamped or clipped in position close adjacent the flange $g'$.

At the other end this outermost member $a$ is attached to some fixed part of the frame or support carrying the thing or part to be operated. For example, as shown in Fig. 1, this outermost member $a$ is clamped by the collar $h^\times$ to the sleeve $h$, on the outer end of which are carried spring-arms or prongs $h'$, which latter are adapted to be sprung over the nipple $i$ of the ordinary pneumatic release $j$, such as illustrated in Fig. 2, or instead of attaching this end of the outermost member, as shown in Figs. 1 and 2, same may simply be passed up inside a tube or sleeve $k$, as shown in Fig. 3, and the said tube or sleeve squeezed or cramped onto this end of the outermost cover $a$, to thereby firmly grip and hold same, the end $b'$ of the innermost member in the case illustrated in Fig. 2 passing up against the inside of the pneumatic cylinder $j$, whereby the latter is raised, as in the case of pneumatic pressure, or said end $b'$ of the innermost member $b$ may be attached to the slide $l$ in the tube $k$, (see Fig. 3,) the arm $l'$ attached to said slide being at its other end pivoted at $m'$ to the lever $m$, by which the shutter is operated or released.

As shown in Fig. 1, it may be desirable to surround the end $b'$ of the innermost member with a closely-coiled wire, (designated at $b^\times$,) which will serve to guide this end of the innermost member.

The open coiled spring $c$, forming the intermediate member, at one end bears against the sleeve $h$, to which the outermost member is attached, and at its other end said spring $c$ bears against the end of the shank $d$ of the push-button, which end is enlarged at $f$ to form a stop which bears against an internal abutment or shoulder $n$, formed in the sleeve $g$, said coiled spring $c$ being normally held in compression between the sleeve $h$ and the said abutment $n$ in the sleeve $g$ in such wise that the flexible outermost member $a$ is normally kept stretched to the utmost limit of its extensibility lengthwise by the action of said spring $c$, and, furthermore, as this spring $c$ is arranged to act on the shoulder or innermost end of the shank $d$ of the push-piece to which the innermost member $b$ is attached, consequently said shank $d$ is normally kept pressed outwardly with the stop $f$ pressed against the abutment $n$, and thus the innermost member $b$ is normally kept pressed outwardly in operative position—i. e., in position for the operator to push same inward when it is desired to release or operate the shutter, &c.—and thus the coiled spring $c$ not only serves as guide or means to enable the flexible innermost member to be slid or moved longitudinally with respect to the outermost member, as well as said intermediate member; but this intermediate member also, according to this invention, is arranged as a coiled spring with the dual purposes and having the following dual functions: First, it normally keeps the flexible outermost member (of the aforesaid character) stretched to the limit of its extensibility; and, second, it normally keeps the innermost member or the end of the push-piece thereon pressed outwardly in readiness for the operator to push same inward to operate the part or thing to be operated.

In the modification shown in Fig. 4 the outermost member $a$ and the innermost member $b$ are identical or similar in all respects to the members $a$ and $b$ described and shown in Fig. 1; but the intermediate member $c^\times$ in the modification illustrated in Fig. 4 is not arranged as a spring, but is formed as a closely-coiled wire which is interposed between the inner and outer members $a$ and $b$, while an external spring $o$ is arranged to act on the lever or arm $p$, pivoted at one end $p'$, and at the other end $p^2$, pivoted to the end $b'$ of the innermost member $b$, so that, as will be obvious, this spring $o$ (carried on some fixed part of the frame of the thing to be operated) will serve the same dual functions as the spring $c$ in Fig. 1—namely, to normally keep the outermost member stretched to the limit of its extensibility and to normally keep said innermost member pressed outwardly ready to be operated.

What I claim is—

1. Mechanism for the transmission of power in varying directions; comprising a flexible outer member which is compressible lengthwise and crosswise but is inextensible beyond its normal length, an inner member which is incompressible lengthwise and is adapted to slide within said outer member, means attached to said inner and outer members respectively at one end whereby said inner member may be pushed inward, means at the other end of said inner and outer members to attach the former to the part to be operated when the inner member is pushed inward as aforesaid, and a spring adapted to normally keep the outer member stretched to the limit of its extensibility and also adapted to normally keep the inner member pressed outwardly so as to be ready to be operated substantially as and for the purposes described.

2. Mechanism for the transmission of power in varying directions; comprising a flexible outer member composed of fibrous material which is compressible lengthwise and crosswise but is inextensible beyond its normal length, an inner member which is incompressible lengthwise and is adapted to slide within said outer member, means attached to said inner and outer members respectively at one end whereby said inner member may be pushed inward, means at the other end of said inner and outer members to attach the former to the part to be operated when the inner member is pushed inward as aforesaid, and a spring adapted to normally keep the outer member stretched to the limit of its extensibility and also adapted to normally keep the inner member pressed outwardly so as to be ready to be operated, substantially as and for the purposes described.

3. Mechanism for the transmission of power in varying directions; comprising a flexible outer member of braid which is compressible lengthwise and crosswise but is inextensible beyond its normal length, an inner member which is incompressible lengthwise and is adapted to slide within said outer member, means attached to said inner and outer members respectively at one end whereby said inner member may be pushed inward, means at the other end of said inner and outer members to attach the former to the part to be operated when the inner member is pushed inward as aforesaid, and a spring adapted to normally keep the outer member stretched to the limit of its extensibility and also adapted to normally keep the inner member pressed outwardly so as to be ready to be operated substantially as and for the purposes described.

4. Mechanism for the transmission of power in varying directions; comprising a flexible outer member of braided fibrous material which is compressible lengthwise and crosswise but is inextensible beyond its normal length, an inner member which is incompressible lengthwise and is adapted to slide within said outer member, means attached to said inner and outer members respectively at one end whereby said inner member may be pushed inward, means at the other end of said inner and outer members to attach the former to the part to be operated when the inner member is pushed inward as aforesaid, and a spring adapted to normally keep the outer member stretched to the limit of its extensibility and also adapted to normally keep the inner member pressed outwardly so as to be ready to be operated substantially as and for the purposes described.

5. Mechanism for the transmission of power in varying directions; comprising a flexible outermost member which is inextensible lengthwise, a flexible innermost member which is incompressible lengthwise, and an intermediate member consisting of a coiled spring surrounding the innermost member and interposed between the latter and the outermost member and so connected at each end that the innermost member will thereby be maintained in operative position and adapted at the same time to normally keep the flexible outermost member stretched to the limit of its extensibility, substantially as and for the purposes described.

6. Mechanism for the transmission of power in varying directions; comprising a flexible outermost member which is inextensible lengthwise but is compressible crosswise a flexible innermost member which is incompressible lengthwise and an intermediate member consisting of a coiled spring surrounding the innermost member and interposed between the latter and the outermost member and so connected at each end that the innermost member will thereby be maintained in operative position and adapted at the same time to normally keep the flexible outermost member stretched to the limit of its extensibility substantially as and for the purposes described.

7. Mechanism for the transmission of power in varying directions; comprising a flexible outermost member which is inextensible lengthwise but is compressible crosswise, a flexible innermost member which is incompressible lengthwise and an intermediate member consisting of an open coiled spring surrounding the innermost member and interposed between the latter and the outermost member and so connected at each end that the innermost member will thereby be maintained in operative position and adapted at the same time to normally keep the flexible outermost member stretched to the limit of its extensibility, substantially as and for the purposes described.

8. Mechanism for the transmission of power in varying directions; comprising a flexible outermost member which is inextensible lengthwise, a flexible innermost member which is incompressible lengthwise, and an intermediate member consisting of a coiled spring surrounding the innermost member and so interposed between the latter and the outermost member as to engage that end of the innermost member which is to be acted on by the operator and the opposite end of said outermost member in such wise that the said end of the innermost member will be normally kept pressed outward and means to enable the operator to push inward said innermost member substantially as and for the purposes described.

9. Mechanism for the transmission of power in varying directions comprising a flexible outermost member composed of fibrous material which is inextensible lengthwise but compressible crosswise, a flexible innermost member which is incompressible lengthwise and an intermediate member consisting of a coiled spring surrounding the innermost member and so interposed between the latter and the outermost member as to engage that end of the innermost member which is to be acted on by the operator and the opposite end of said outermost member in such wise that the said end of the innermost member will be normally kept pressed outward, and means to enable the operator to push inward said innermost member substantially as and for the purposes described.

10. Mechanism for the transmission of power in varying directions comprising a flexible outermost member of braid which is inextensible lengthwise a flexible innermost member which is incompressible lengthwise and an intermediate member consisting of a coiled spring surrounding the innermost member and so interposed between the latter and the outermost member as to engage that end of the innermost member which is to be acted on by the operator and the opposite end of said outermost member in such wise that the said end of the innermost member will be normally kept pressed outward and means to enable the operator to push inward said innermost member substantially as and for the purposes described.

11. Mechanism for the transmission of power in varying directions comprising a flexible outermost member of braided fibrous material which is inextensible lengthwise a flexible innermost member which is incompressible lengthwise and an intermediate member consisting of a coiled spring surrounding the innermost member and so interposed between the latter and the outermost member as to engage that end of the innermost member which is to be acted on by the operator and the opposite end of said outermost member in such wise that the said end of the innermost member will be normally kept pressed outward and means to enable the operator to push inward said innermost member substantially as and for the purposes described.

In witness whereof I have hereunto set my hand in presence of two witnesses.

ARTHUR HENRY EDWARDS.

Witnesses:
H. D. JAMESON.
A. NUTTING.